UNITED STATES PATENT OFFICE.

AUGUST O. EDWARDS, OF LINDSAY, CALIFORNIA.

PROCESS FOR PICKLING CANTALOUPS.

1,155,555.  Specification of Letters Patent.  Patented Oct. 5, 1915.

No Drawing.   Application filed December 24, 1914.   Serial No. 878,975.

*To all whom it may concern:*

Be it known that I, AUGUST O. EDWARDS, a citizen of the United States, residing at Lindsay, in the county of Tulare and State of California, have invented certain new and useful Improvements in Processes for Pickling Cantaloups, of which the following is a specification.

This invention relates to the process of pickling cantaloups. As the cantaloups for pickling are picked quite small and unripe the use of a crop in this manner permits of growing two crops of cantaloups on the same land in one season, whereas, but one crop could be grown were the melons allowed time to ripen. The productive value is thus doubled, as the value of a crop of cantaloups for pickles is as great as when allowed to ripen. Ripened cantaloups are a luxury; the market for them is uncertain and unstable; they decay so rapidly that the farmer's possible profit may turn into a loss before disposing of them. My pickling process makes a certain crop, and the resultant profits, from an uncertain one. The crop is preserved in such a way that it is salable the year around. Furthermore, cantaloups pickled by my process are an extremely delicious edible.

The inventive idea involved is capable of expression in a variety of ways, one of which is herein specifically described, but the specific example given is solely for the purpose of illustrating the invention, and not for the purpose of defining the limits thereof, reference being had to the claims for this purpose.

The process consists in selecting very small unripened cantaloups, washing them thoroughly in clear water, immersing them for approximately forty-eight hours in a solution of substantially one part salt to four parts water, which extracts the bitterness from the melons, then removing them from said solution and immersing them for approximately twenty-four hours in a solution of substantially one part salt to one part water, which makes the melons crisp and firm. They are then removed from the latter solution and placed in clear water for approximately twenty-four hours. The cantaloups are then taken from the water and placed in glass jars wherein they are to be kept until used. Vinegar of not too great acidity is then poured over them. The jars are then placed in the sunlight for approximately twenty-four hours, which restores them to their natural color.

The proportions of the ingredients may vary within wide limits, dependent upon the characteristics desired to be imparted to the final product.

I claim:

1. The process of pickling cantaloups by subjecting small unripened melons to the action of a solution of substantially four parts of water and one part of salt for approximately forty-eight hours, transferring the melons to a solution of substantially one part salt to one part water and permitting them to remain therein for approximately twenty-four hours, transferring the melons to clear water in which they are to be kept approximately twenty-four hours, removing them to a glass container and pouring vinegar over them, exposing them to the sunlight for approximately twenty-four hours.

2. The process of pickling cantaloups which consists in subjecting small unripened melons to the action of brine for approximately forty-eight hours, removing the melons therefrom and immersing them in a much stronger brine for approximately twenty-four hours, removing the melons therefrom and immersing them in clear water for approximately twenty-four hours, removing them therefrom and immersing them in vinegar, and then applying means to restore their natural color.

In testimony whereof I affix my signature in presence of two witnesses.

AUGUST O. EDWARDS.

Witnesses:
C. O. BUFFINGTON,
J. J. GRIFFIN,